United States Patent
Cho et al.

(10) Patent No.: US 8,570,472 B2
(45) Date of Patent: Oct. 29, 2013

(54) OPTICAL COMPENSATION FILM WITH HYBRID ARRANGEMENT OF NEMATIC LIQUID CRYSTALS CONSISTING OF CONNECTED MESOGENS WITH AN ANGLE AND THE METHOD OF MANUFACTURING THE SAME

(75) Inventors: Yonggyun Cho, Daejeon (KR); Kwangjin Chung, Daejeon (KR); Cholho Lee, Daejeon (KR); Yooseock Hwang, Daejeon (KR); Hyukjun Kim, Daejeon (KR); Kiyup Kim, Seoul (KR); Sungho Son, Daejeon (KR); Kibeom Kim, Daejeon (KR)

(73) Assignee: SK Innovation Co., Ltd. (KR)

( * ) Notice: Subject to any disclaimer, the term of this patent is extended or adjusted under 35 U.S.C. 154(b) by 215 days.

(21) Appl. No.: 13/203,361

(22) PCT Filed: Feb. 25, 2010

(86) PCT No.: PCT/KR2010/001179
§ 371 (c)(1),
(2), (4) Date: Aug. 25, 2011

(87) PCT Pub. No.: WO2010/098594
PCT Pub. Date: Sep. 2, 2010

(65) Prior Publication Data
US 2011/0317101 A1    Dec. 29, 2011

(30) Foreign Application Priority Data
Feb. 27, 2009   (KR) .................. 10-2009-0016997

(51) Int. Cl.
*G02F 1/1337*    (2006.01)

(52) U.S. Cl.
USPC ............................................ 349/129; 349/119

(58) Field of Classification Search
USPC ................................................. 349/119, 129
See application file for complete search history.

(56) References Cited

U.S. PATENT DOCUMENTS

| 5,855,971 A | * | 1/1999 | Kobori et al. ............... 428/1.2 |
| 5,883,685 A |   | 3/1999 | Mazaki et al. |

FOREIGN PATENT DOCUMENTS

| JP | 08-050206 | 2/1996 |
| JP | 09-021914 | 1/1997 |
| JP | 2000-111914 | 4/2000 |
| JP | 2000-284126 | 10/2000 |
| JP | 2004-240012 | 8/2004 |
| JP | 2005-062673 | 3/2005 |
| JP | 2005-208414 | 8/2005 |
| JP | 2006-078670 | 3/2006 |
| WO | 2004048499 | 6/2004 |

OTHER PUBLICATIONS

Peter F. H. Schwab, et al., "Molecular Rods. 1. Simple Axial Rods," Chemical Reviews, 1999, pp. 1863-1933, vol. 99, No. 7, American Chemical Society.

(Continued)

*Primary Examiner* — Phu Vu
(74) *Attorney, Agent, or Firm* — Cantor Colburn LLP

(57) ABSTRACT

Provided are an optical compensation film and a method for producing the same. The optical compensation film includes a nematic liquid crystal compound including a compound having at least two mesogens linked to each other with a constant angle, and has hybrid alignment in which the alignment of the liquid crystal compound varies gradually along the thickness direction.

12 Claims, 1 Drawing Sheet

(56) References Cited

OTHER PUBLICATIONS

Dae Hwan Yoon, et al., "Electrical Conduction through Linear Porphyrin Arrays," J. Am. Chem. Soc., 2003, pp. 11062-11064, vol. 125, No. 36, American Chemical Society.

Iwao Tabushi, et al., "Artificial Allosteric System. 2. Cooperative 1-Methylimidazole Binding to an Artificial Allosteric System, Zinc-Gable Porphyrin-Dipyridylmethane Complex," J. Am. Chem. Soc., 1985, pp. 4192-4199, vol. 107, No. 14, American Chemical Society.

Ryoichi Takahashi, et al., "Hexameric and Pentameric Slipped-Cofacial Dimers: Toward an Artificial Light-Harvesting Complex," J. Org. Chem., 2005, pp. 2745-2753, vol. 70, No. 7, American Chemical Society.

Akihiko Tsuda, et al., "Fully Conjugated Porphyrin Tapes with Electronic Absorption Bands That Reach into Infrared," Science, Jul. 6, 2001, pp. 79-82, vol. 293, American Association for the Advancement of Science.

Taisuke Kamada, et al., "High Fidelity Self-Sorting Assembling of meso-Cinchomeronimide Appended meso-meso Linked Zn(II) Diporphyrins," J. Am. Chem. Soc., 2006, pp. 7670-7678, vol. 128, No. 23, American Chemical Society.

Dongho Kim, et al., "Directly Linked Porphyrin Arrays with Tunable Excitonic Interactions," Accounts of Chemical Research, Oct. 2004, pp. 735-745, vol. 37, No. 10, American Chemical Society.

Thomas Ljungdahl, et al., "Geometrically Homogenous Series of Covalently Linked Zinc/Free-Base Porphyrin Dimers of Varying Length; Design, Synthesis and Characterization," Eur. J. Org. Chem., 2006, pp. 3087-3096, Wiley-VCH Verlag GmbH & Co. KGaA, Weinheim, Germany.

Xianglin Shi, et al., "3-Cyclobutenyl-1, 2-dione-Substituted Porphyrins. A General and Efficient Entry to Porphyrin-Quinone and Quinone-Porphyrin-Quinone Architectures," J. Org. Chem., 2000, pp. 1650-1664, vol. 65, No. 6, American Chemical Society.

Chusaku Ikeda, et al., "Helicity Induction and Two-Photon Absorbance Enhancement in Zinc(II) Meso-Meso Linked Porphyrin Oligomers via Intermolecular Hydrogen Bonding Interactions," J. Am. Chem. Soc., 2005, pp. 534-535, vol. 127, No. 2, American Chemical Society.

Iwao Tabushi, et al., "Gable-Porphyrin as a Cytochrome-c3 Model," Tetrahedron Letters, 1982, pp. 1913-1916, vol. 23, No. 18, Pergamon Press Ltd., UK.

International Search Report-PCT/KR2010/001179 dated Sep. 14, 2010.

European Search Report—European Application No. 10746433 issued on Jul. 30, 2012, citing US5855971, US5883685 and WO2004048499.

\* cited by examiner

OPTICAL COMPENSATION FILM WITH HYBRID ARRANGEMENT OF NEMATIC LIQUID CRYSTALS CONSISTING OF CONNECTED MESOGENS WITH AN ANGLE AND THE METHOD OF MANUFACTURING THE SAME

The present application contains subject matter related to Korean Patent Application No. 10-2009-0016997, filed in the Korean Intellectual Property Office on Feb. 27, 2009, the entire contents of which is incorporated herein by reference.

TECHNICAL FIELD

The present invention relates to an optical compensation film including a nematic liquid crystal compound containing at least two mesogens linked to each other with a constant angle and having hybrid liquid crystal alignment, as well as to a method for producing the same.

BACKGROUND ART

Liquid crystal display devices (LCDs) are display devices including a liquid crystal substance injected between two glass substrates and using the electro-optical properties of the liquid crystal under the application of external voltage. Such LCDs are distinguished from other known display devices in that they use external incident light. In addition, LCDs are advantageous in that they are thin and light and consume less power. In general, LCDs have been widely used for various applications, including televisions (TV), monitors for personal computers (PC), car navigations, digital cameras, cellular phones, or the like.

The driving modes of such liquid crystal displays include twisted nematic (TN) modes using nematic crystals, super twisted nematic (STN) modes, in-plane switching (IPS) modes, vertical alignment (VA) modes, optically compensated bend (OCB) modes, or the like. Since the liquid crystals having such types of driving modes are optically anisotropic materials having two different indexes, i.e., ordinary refractive index and extraordinary refractive index, light path and birefringence are varied with the angle of incidence of light. Therefore, variations in contrast ratios (CR) and gray scale inversion phenomena occur depending on the direction of watching a screen. Particularly, because vertically aligned liquid crystals, such as twisted nematic liquid crystals, show a large variation in phase difference (And) depending on the direction of light propagation, they have disadvantages of a narrow view angle and a low contrast ratio. To improve such disadvantages, compensation films have been used to compensate for such a phase difference and to increase a view angle.

In this context, Japanese Laid-Open Patent No. 2004-240012 discloses a retardation sheet including a first optical anisotropic layer having a phase difference of substantially $\lambda/2(\pi)$ at a wavelength of 550 nm, a second optical anisotropic layer having a phase difference of substantially $\lambda/4(\pi/2)$ at a wavelength of 550 nm, and a third optical anisotropic layer having alternating anisotropy, stacked successively, and has a retardation/wavelength value of 0.2-0.3 as measured at a wavelength of 450 nm, 550 nm and 650 nm, wherein at least one of the first optical anisotropic layer and the second optical anisotropic layer is formed of liquid crystal molecules immobilized with nematic alignment in which the liquid crystal molecules have a tilt angle of 5-35°. However, such a stacked sheet requires a complicated treating process, such as adhesive coating or binding, and may generate defected products in the case of a misaligned axis, resulting in a drop of yield and an increase in manufacturing cost. In addition, because expression of individual optical anisotropy may be affected by various conditions, including polymer molecular weights, temperatures or extension rates, it is difficult to control the anisotropy of each layer precisely.

To solve the above problems, Japanese Laid-Open Patent No. 2005-208414 discloses a high-dispersion retardation film including liquid crystal monomers having a discotic mesogen and a nematic mesogen end-capped with a polymerizable group in the molecules, wherein the discotic mesogen and the nematic mesogen are aligned in such a manner that both optical axes are substantially in parallel with each other and are immobilized while maintaining such alignment. Japanese Laid-Open Patent No. 2006-78670 discloses an integral optical compensation sheet having an optical anisotropic layer having different refraction indexes in three directions and a transparent support, wherein the optical anisotropic layer is formed by polymerizing discotic liquid crystals having at least one polymerizable group and a compound having multiple polymerizable groups. In addition, Japanese Patent Publication No. 3399705 and No. 2587398 disclose a method of realizing an effect of view angle compensation through hybrid alignment of discotic nematic liquid crystals.

The inventors of the present invention have conducted many studies to provide an effect of view angle compensation in an optical compensation film. We have found that it is possible to provide an optical compensation film for LCDs having a significantly improved effect of view angle compensation by using a novel nematic liquid crystal compound having at least two mesogens linked to each other with a constant angle and by aligning the liquid crystals in the form of hybrid alignment.

DISCLOSURE

Technical Problem

An object of the present invention is to provide an optical compensation film with an effect of view angle compensation, which uses a nematic liquid crystal compound having at least two mesogens linked to each other with a constant angle, and has hybrid liquid crystal alignment, as well as a method for producing the same.

Technical Solution

To achieve the object of the present invention, the present invention provides a nematic liquid crystal compound including a compound having at least two mesogens linked to each other with a constant angle.

The present invention also provides an optical compensation film for a liquid crystal display device, including a coating layer with hybrid alignment in which the alignment of the nematic liquid crystal compound including a compound represented by Chemical Formula 1 varies gradually along the thickness direction from the surface of an aligning layer:

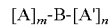   [Chemical Formula 1]

wherein m and n independently represent a natural number ranging from 1 to 12;

A and A' are the same or different and each represents a discotic type mesogen or rod-like mesogen, wherein A' and A', or A and A are linked to each other via direct bonding between the two mesogens or by way of a spacer; and B is a functional group maintaining a geometrically constant binding angle.

Further, the present invention provides a method for producing an optical compensation film, including:
  forming an aligning layer on a substrate film;
  coating a liquid crystal solution containing a nematic liquid crystal compound including the compound of Chemical Formula 1 on the top of the aligning layer to form a film with a hybrid liquid crystal alignment structure; and
  irradiating the resultant film with ultraviolet rays at 50-150° C. to immobilize the hybrid liquid crystal alignment structure.

Further, the present invention provides a polarizer including the above-mentioned optical compensation film.

Further, the present invention provides a liquid crystal display device using the above-mentioned optical compensation film.

Advantageous Effects

The optical compensation film using a liquid crystal compound containing at least two mesogens and having hybrid alignment of liquid crystals according to one embodiment of the present invention provides an excellent effect of view angle compensation.

DESCRIPTION OF DRAWINGS

The above and other objects, features and advantages of the present invention will become apparent from the following description of preferred embodiments given in conjunction with the accompanying drawings, in which.

BEST MODE

Figure 1:
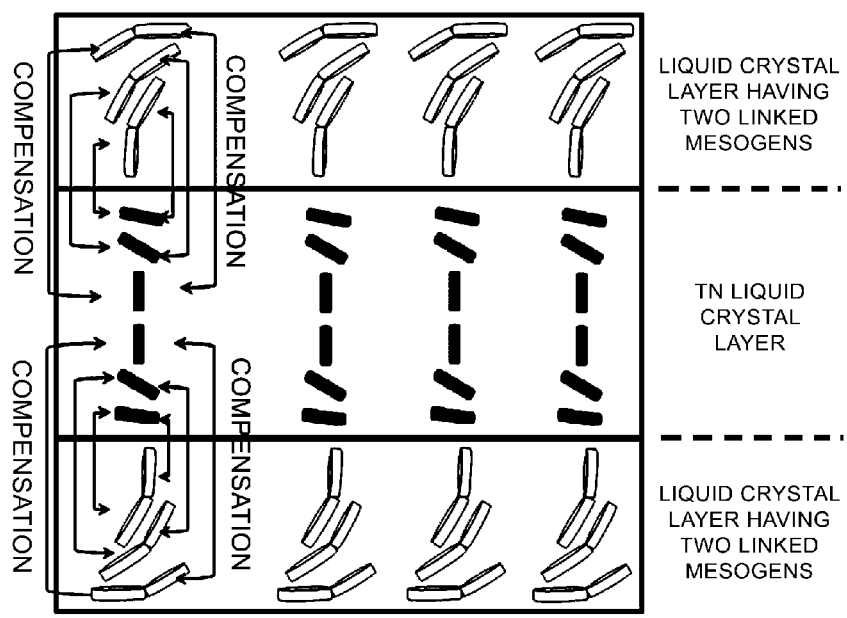
FIG. 1 is a schematic view illustrating a hybrid structure of liquid crystals in accordance with an embodiment of the present invention and the principle of optical compensation obtained therefrom.

Hereinafter, a preferred embodiment of the present invention will be described in detail. For the purposes of clarity and simplicity, a detailed description of known functions and configurations incorporated herein will be omitted as it may make the subject matter of the present invention unclear.

As used herein, the terms "about", "substantially", or any other version thereof, are defined as being close to the value as mentioned, when a unique manufacturing and material tolerance is specified. Such terms are used to prevent any unscrupulous invader from unduly using the disclosure of the present invention including an accurate or absolute value described to assist the understanding of the present invention.

In one aspect, there is provided a nematic liquid crystal compound including a compound represented by Chemical Formula 1:

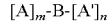 [Chemical Formula 1]

wherein
  m and n independently represent a natural number ranging from 1 to 12;
  A and A' are the same or different and each represents a discotic type mesogen or rod-like mesogen; and
  B is a functional group maintaining a geometrically constant binding angle.

In Chemical Formula 1, A and A' independently represent a discotic type or rod-like mesogen. Both may be rod-like mesogens or discotic type mesogens, or represent a combination of discotic type mesogens and rod-like mesogens. Preferably, both A and A' are discotic type mesogens.

B is a functional group maintaining a geometrically constant binding angle.

B is a functional group characterized in that it shows no strain and no variation in binding angle. Thus, B allows both mesogens to maintain a constant binding angle, thereby improving a view angle.

Particular examples of B include:

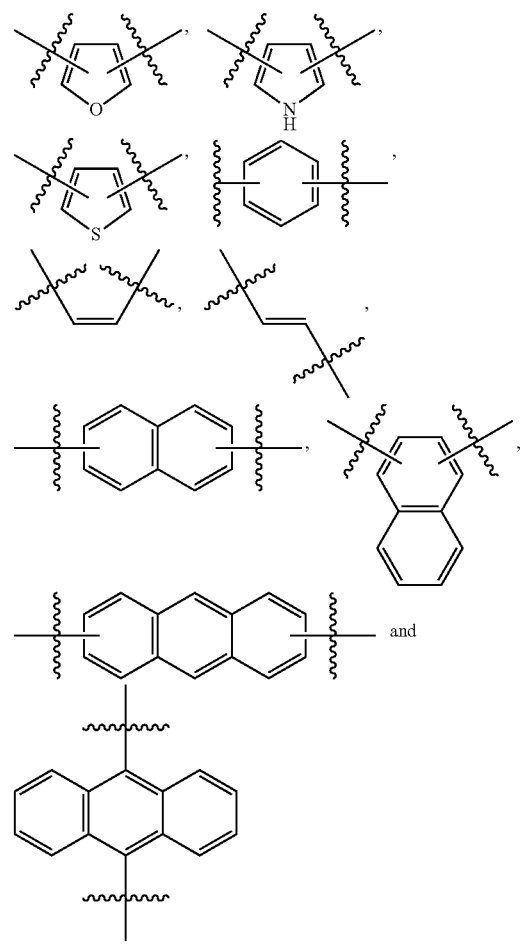

A' and A', or A and A are linked to each other via direct bonding between the two mesogens or by way of a spacer. Preferably, the two mesogens are linked linearly to each other. Linear linkage between two mesogens is described in more detail in Chem. Rev. 1999, Vol. 99, 1863; J. Am. Chem. Soc. 2003, Vol. 125, 11062; J. Am. Chem. Soc. 1985, Vol. 107, 4192; J. Org. Chem. 2005, Vol. 70, 2745; Science, 2001, Vol. 293, 79; J. Am. Chem. Soc. 2006, Vol. 128, 7670; Accounts of Chemical Research, 2004, Vol. 37, 735; and Eur. J. Org. Chem. 2006, 3087.

According to another embodiment of the present invention, the liquid crystal compound includes, but is not limited to, a compound wherein m is 1, n is 1 and both A and A' are compounds represented by Chemical Formula 2:

[Chemical Formula 2]

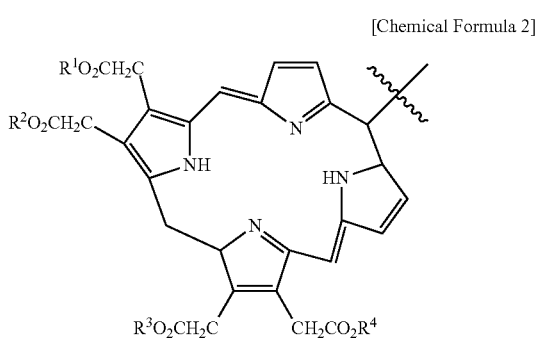

wherein $R^1$ through $R^4$ independently represent (C1-C14)alkyl, (C1-C14)alkoxy, (C1-C14)alkylcarbonyl, (C6-C20)aryl, (C6-C20)arylcarbonyl, (C1-C14)alkoxycarbonyl, (C6-C20)aryloxycarbonyl, carbamoyl or sulfamoyl;

wherein the alkyl, the alkyl at the alkylcarbonyl, the alkoxy, and the alkoxy at the alkoxycarbonyl of $R^1$ through $R^4$ may include a linear or branched, saturated or unsaturated bond, and the alkyl, aryl, alkanoyl, alkenoyl, alkynoyl, aryloyl, alkoxycarbonyl, aryloxycarbonyl, carbamoyl or sulfamoyl of $R^1$ through $R^4$ may be further substituted with at least one substituent selected from the group consisting of halogen, cyano and hydroxyl.

More particularly, $R^1$ through $R^4$ independently represent (C1-C14)alkyl, (C6-C20)aryl, (C1-C14)alkanoyl, (C3-C20)alkenoyl, (C3-C20)alkynoyl, (C7-C20)aryloyl, (C1-C14) alkoxycarbonyl, (C6-C20)aryloxycarbonyl, carbamoyl or sulfamoyl;

wherein the alkyl, aryl, alkanoyl, alkenoyl, alkynoyl, aryloyl, alkoxycarbonyl, aryloxycarbonyl, carbamoyl or sulfamoyl of $R^1$ through $R^4$ may be further substituted with at least one substituent selected from the group consisting of halogen, cyano and hydroxyl.

FIG. 1 is a schematic view illustrating a hybrid structure of liquid crystals in accordance with an embodiment of the present invention and the principle of optical compensation obtained therefrom. Referring to FIG. 1, two liquid crystal layers exist as the top layer and the bottom layer, wherein the alignment of the nematic liquid crystal compound, including the compound of Chemical Formula 1 containing the two mesogens linked to each other, varies gradually along the thickness direction along the surface of an aligning layer. In addition, a liquid crystal layer is inserted between the two layers as an intermediate layer, wherein the alignment of the twisted nematic liquid crystals varies gradually along the thickness direction in a similar manner. In this case, each liquid crystal layer is positioned so that each mesogen in the top layer and the bottom layer and the twisted nematic liquid crystal compound in the intermediate layer compensate for each other. In this manner, it is possible to realize an effect of optical compensation and to improve a view angle.

In another aspect, there is provided an optical compensation film for a liquid crystal display device, including a coating layer with hybrid alignment in which the alignment of the nematic liquid crystal compound including a compound of Chemical Formula 1 varies gradually along the thickness direction from the surface of an aligning layer.

Particularly, there is provided an optical compensation film including the above-described nematic liquid crystal compound, and the optical compensation film may be provided by the method described hereinafter.

Thus, in still another aspect, there is provided a method for producing an optical compensation film, including:

forming an aligning layer on a substrate film;

coating a liquid crystal solution containing a nematic liquid crystal compound having at least two mesogens linked to each other on the top of the aligning layer to form a film with a hybrid liquid crystal alignment structure; and irradiating the resultant film with ultraviolet rays at 50-150° C. to immobilize the hybrid liquid crystal alignment structure.

More particularly, the present invention provides a method for producing an optical compensation film, including:

forming an aligning layer on a substrate film;

coating a liquid crystal solution containing a nematic liquid crystal compound including the compound of Chemical Formula 1 on the top of the aligning layer to form a film with hybrid liquid crystal alignment structure; and irradiating the resultant film with ultraviolet rays at 50-150° C. to immobilize the hybrid liquid crystal alignment structure in such a manner that the alignment of the nematic liquid crystal compound including the compound of Chemical Formula 1 varies gradually along the thickness direction from the surface of the aligning layer and thus is in hybrid alignment.

The optical compensation film obtained from the above-mentioned method in accordance with an embodiment of the present invention includes: a substrate layer; an aligning layer disposed on the top of the substrate layer; and a coating layer on the aligning layer, containing a nematic liquid crystal compound including the compound of Chemical Formula 1.

To produce the optical compensation film in accordance with an embodiment of the present invention, a solution of alignining agent may be coated onto a substrate film and then dried to form an aligning layer.

In a particular embodiment, the substrate layer, i.e., the substrate film is transparent. In other words, the substrate layer has a light transmission of at least 80%. The substrate layer may be selected from the group consisting of glass, olefinic resins, cycloolefinic resins, ester resins, polycarbonate, polyacrylate, polysulfone, and a mixture and a copolymer thereof. Particular examples of the substrate film may include cellulose ester, polycarbonate, polysulfone, polyether sulfone, polyacrylate, polymethacrylate, norbornene resins, etc. More particularly, the substrate layer is in the form of a film, such as cellulose triacetate (TAC) or polyethylene terephthalate.

Preferably, the substrate layer, i.e. the substrate film has a thickness of 20-500 μm, more preferably 40-200 μm. In addition, the substrate layer may be oriented to impart optical anisotropy. In the case of a cellulose ester film, a retardation enhancer may be further added thereto. In addition, the substrate layer may be subjected to glow discharge, corona discharge, UV treatment, flame treatment, alkali treatment, acid treatment, etc. Otherwise, a tackifying layer may be attached to the substrate layer.

First, an aligning layer may be formed on the top of the substrate film. The aligning layer includes a resin selected from the group consisting of polyimide, polystyrene-based polymers, gelatin, polyvinyl alcohol-based polymers, and a mixture and a copolymer thereof. More preferably, a polyvinyl alcohol-based polymer is used.

The aligning layer may be formed by coating a solution of aligning agent onto the top of the substrate film, followed by drying, and subjecting the resultant coating to application of a magnetic field, optical treatment or rubbing treatment. The solution may contain 0.1-10 wt % of a resin to be used in forming the aligning layer and may further include additives capable of controlling alignment.

The solution of aligning agent may be coated onto the substrate film via a bar coating process, gravure coating process, die coating process, roll coating process, meniscus roll coating process, etc. Then, the coating is dried at 40-200° C., preferably at 50-100° C., followed by rubbing treatment, to provide the aligning layer.

Next, a solution, containing a nematic liquid crystal compound including the compound represented by Chemical Formula 1 having at least two mesogens linked to each other with a constant angle, is coated onto the top of the aligning layer to form a film:

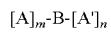  [Chemical Formula 1]

wherein m and n independently represent a natural number ranging from 1 to 12;

A and A' are the same or different and each represents a discotic type mesogen or rod-like mesogen; and B is a functional group maintaining a geometrically constant binding angle.

Herein, A' and A', or A and A are linked to each other via direct bonding between the two mesogens or by way of a spacer. Preferably, the two mesogens are linked linearly to each other.

In the nematic liquid crystal compound including the compound having at least two mesogens linked to each other with a constant angle, both mesogens may be discotic type mesogens or rod-like mesogens, or a combination thereof. Preferably, the mesogens include a discotic type mesogen. More preferably, both mesogens are discotic type mesogens. Addition of such a nematic liquid crystal compound having at least two linked mesogens selected from the above types of mesogens may realize an effect of view angle compensation and provide an optical compensation film having an improved color shift. It is thought that at least two mesogens linked to each other maintain a constant angle so as to immobilize the alignment of liquid crystals stably by the irradiation of light, resulting in optical anisotropy.

Particular examples of the nematic liquid crystal compound, including a compound having at least two mesogens linked to each other with a constant angle, may include a compound represented by Chemical Formula 3, but are not limited thereto:

wherein the alkyl, the alkyl at the alkylcarbonyl, the alkoxy, and the alkoxy at the alkoxycarbonyl of $R^1$ through $R^8$ may include a linear or branched, saturated or unsaturated bond, and the alkyl, aryl, alkanoyl, alkenoyl, alkynoyl, aryloyl, alkoxycarbonyl, aryloxycarbonyl, carbamoyl or sulfamoyl of $R^1$ through $R^8$ may be further substituted with at least one substituent selected from the group consisting of halogen, cyano and hydroxyl.

More particularly, $R^1$ through $R^8$ independently represent (C1-C14)alkyl, (C6-C20)aryl, (C1-C14)alkanoyl, (C3-C20)alkenoyl, (C3-C20)alkynoyl, (C7-C20)aryloyl, (C1-C14)alkoxycarbonyl, (C6-C20)aryloxycarbonyl, carbamoyl or sulfamoyl;

wherein the alkyl, aryl, alkanoyl, alkenoyl, alkynoyl, aryloyl, alkoxycarbonyl, aryloxycarbonyl, carbamoyl or sulfamoyl of $R^1$ through $R^8$ may be further substituted with at least one substituent selected from the group consisting of halogen, cyano and hydroxyl.

Synthesis of such liquid crystal compounds is described, for example, in J. Am. Chem. Soc., 1985, Vol. 107, 4192; Tetrahedron Lett., Vol. 23, 1913, 1982; J. Org. Chem. 2000, Vol. 65, 1650; and J. Am. Chem. Soc., 2005, Vol. 127, 534.

A solution, containing a nematic liquid crystal compound including the compound having at least two mesogens linked to each other with a constant angle, includes the liquid crystal compound in an amount of 1-30 wt % based on the total solution. When the liquid crystal compound is present in an amount less than 1 wt %, it is not possible to provide a sufficient effect of optical compensation or sufficient improvement in color shift. Even when the liquid crystal compound is present in an amount greater than 30 wt %, it is not possible to provide any additional improvement, resulting in waste of materials.

The coating layer of the liquid crystal compound may be formed to a thickness of 0.5-10 μm.

Particular examples of the method used to form the coating layer of the liquid crystal compound on the top of the aligning layer include a bar coating process, gravure coating process, die coating process, roll coating process or meniscus roll coating process, but are not limited thereto.

Then, the resultant film containing the liquid crystal compound is irradiated with ultraviolet rays at 50-150° C. to prepare the optical compensation film in accordance with an embodiment of the present invention.

[Chemical Formula 3]

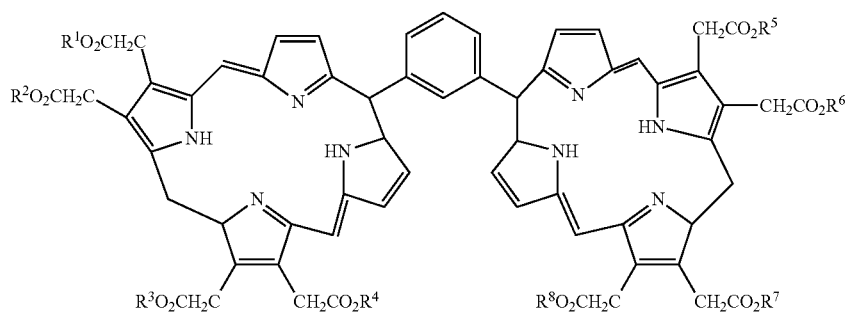

wherein $R^1$ through $R^8$ independently represent (C1-C14)alkyl, (C1-C14)alkoxy, (C1-C14)alkylcarbonyl, (C6-C20)aryl, (C6-C20)arylcarbonyl, (C1-C14)alkoxycarbonyl, (C6-C20)aryloxycarbonyl, carbamoyl or sulfamoyl;

The resultant film includes the liquid crystal molecules having two mesogens linked to each other, wherein the alignment of the liquid crystal molecules varies gradually along the thickness direction. Such hybrid alignment, in which the alignment of the liquid crystal molecules varies gradually along the axis of the thickness direction, may be obtained by controlling the hydrophilicity in the aligning layer and by micro-adjustment of the drying condition. FIG. 1 shows an embodiment of the hybrid alignment. Herein, the optical anisotropy of the rod-like liquid crystals in the TN liquid crystal cells is compensated by the hybrid type liquid crystals in the compensation film, thereby realizing an effect of optical compensation.

The advantages, features and aspects of the invention will become apparent from the following description of the embodiments. The present invention may, however, be embodied in many different forms and should not be construed as limited to the exemplary embodiments set forth therein.

Preparation Example 1

The liquid crystal compound as depicted hereinafter is obtained from heptoxycarbonylmethyl-substituted porphyrin by an Ag(I)-promoted coupling process using a 1,3-phenylene spacer. See, J. Am. Chem. Soc., 1985, Vol. 107, 4192.

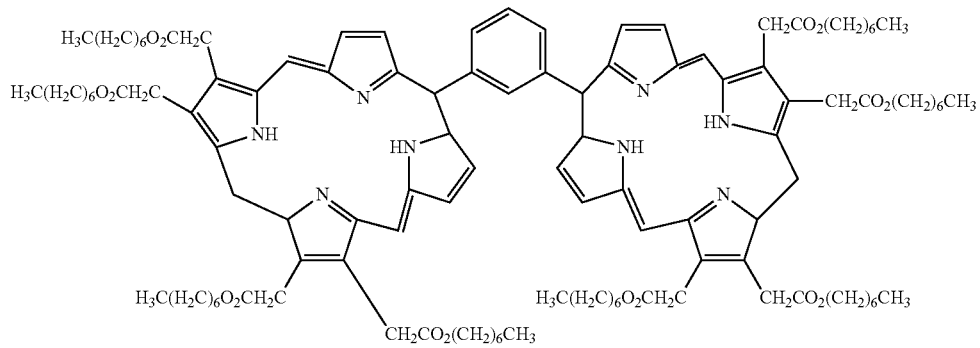

Example 1

Figure 2:
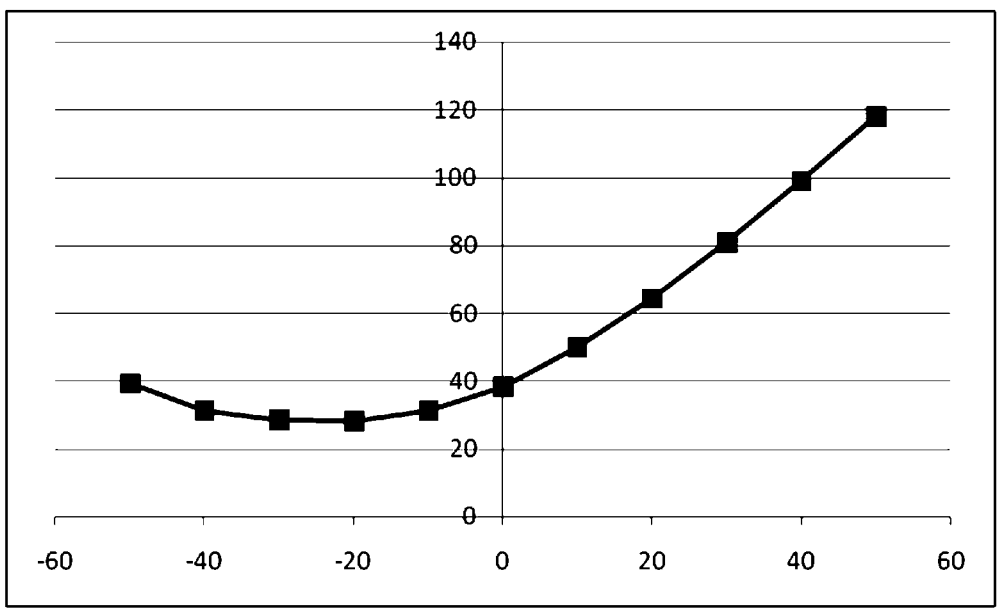
FIG. 2 is a graph showing the phase difference results of the optical compensation film in accordance with an embodiment of the present invention.

A polyvinyl alcohol coating solution is coated onto a cellulose triacetate (TAC) film having a thickness of 60 μm to a coating thickness of 2 μm. The TAC film has a $R_e$ of 3.5 nm and $R_{th}$ of 45 nm, wherein $R_e$ is defined as $(n_x-n_y) \times d$ and $R_{th}$ is defined as $(\frac{1}{2}(n_x+n_y)-n_z) \times d$. Herein, $n_x$ is a refractive index of the light vibrating in one direction of the plane perpendicular to the thickness of the film, $n_y$ is a refractive index of the light vibrating in the direction perpendicular to x-axis in the plane perpendicular to the thickness of the film, and d is the thickness of the film. To form the polyvinyl alcohol (PVA) coating solution, two kinds of PVAs are mixed. To control the hydrophilicity of the PVA coating solution, 0.75 g of R1130 (alkyl-substituted PVA available from Kuraray Chemical Co.) and 0.75 g of reagent-grade PVA (substitution degree 87%) available from Aldrich Co. are mixed with 75 g of double-distilled and deionized water, 24 g of methanol, 0.15 g of 50% aqueous solution of glutaraldehyde and 1.1 g of 0.5M sulfuric acid to provide an aqueous PVA solution. An aqueous solution having a concentration of 12 wt % and containing NaOH and KOH at a ratio of 9:1 is prepared to increase the adhesion between the TAC film and the PVA aligning layer. The TAC film is dipped into the aqueous hydroxide solution for 2 minutes, removed therefrom, washed with water and dried in a drying oven at 80° C. The PVA solution is coated onto the surface-treated TAC film with a NO. Mayer bar, dried at 60° C. for 90 seconds, cooled for 2 minutes, and then further dried at 80° C. for 150 seconds to form an aligning layer. The surface of the aligning layer is rubbed at an angle of 45° to the optical axis of the TAC film using a rubbing machine (available from Mirae Co.). The rubbed aligning layer is coated with a coating solution containing 10% of the liquid crystal compound obtained from Preparation Example 1 to provide a liquid crystal coating film. The liquid crystal solution is obtained by dissolving 2 g of the liquid crystal compound of Preparation Example 1 and 0.01 g of a photopolymerization initiator (Irgacure 907 available from Ciba-Geigy Co.) into 18 g of methyl ethyl ketone. The coating solution is coated onto the aligning layer to a coating thickness of 2 μm using a No. 10 Mayer bar. To form the hybrid alignment of liquid crystals and to maintain the same, laminar flow is introduced to the surface of the liquid crystal coating while adjusting the intensity of the laminar flow precisely. The resultant coated film is transferred to a UV curing machine (available from APO) and the liquid crystal coating is cured at 130° C. for 150 seconds to immobilize the alignment of the liquid crystal molecules. Then, the liquid crystal coating film is subjected to microtomy to obtain its section, and the section is stained with a dye, $OsO_4$. The stained portion is observed with transmission electron microscopy (TEM). It can be seen indirectly from the alignment degree of the stained portion that the liquid crystal molecules are in hybrid alignment. In addition, a birefringence measuring system (KOBRA-WPR, available from Oji Scientific Instrument) is used to measure the phase difference of the film, while varying the incidence angle of the light with a wavelength of 589 nm. The results are shown in FIG. 2. As shown in FIG. 2, the variations in phase difference depending on incidence angles suggest that such hybrid alignment of liquid crystal molecules contributes to better expression of negative phase differences in the liquid crystals. In conclusion, as can be seen from the results of the pattern of variations in phase difference and phase difference values, the liquid crystal coating film provides an excellent effect of view angle compensation.

While the present invention has been described with respect to the specific embodiments, it will be apparent to those skilled in the art that various changes and modifications may be made without departing from the spirit and scope of the invention as defined in the following claims.

The invention claimed is:
1. An optical compensation film for a liquid crystal display device, comprising a coating layer with hybrid alignment in which the alignment of a nematic liquid crystal compound including a compound represented by Chemical Formula 1 varies gradually along the thickness direction from the surface of an aligning layer:

[A]$_m$-B-[A']$_n$  [Chemical Formula 1]

wherein m and n independently represent a natural number ranging from 1 to 12;

A and A' are the same or different and each represents a discotic type mesogen or rod-like mesogen, wherein A' and A' or A and A are linked to each other via direct bonding between the two mesogens or by way of a spacer;

wherein A or A' is a compound represented by Chemical Formula 2:

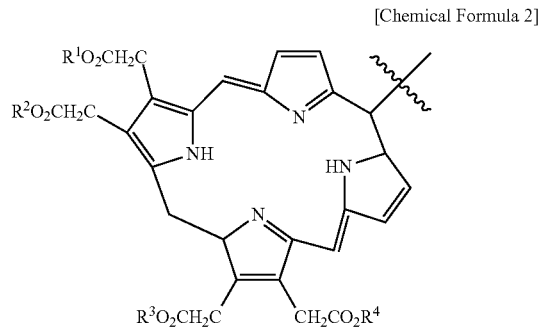

[Chemical Formula 2]

wherein $R^1$ through $R^4$ independently represent (C1-C14)alkyl, (C1-C14)alkoxy, (C1-C14)alkylcarbonyl, (C6-C20)aryl, (C6-C20)arylcarbonyl, (C1-C14)alkoxycarbonyl, (C6-C20)aryloxycarbonyl, carbamoyl or sulfamoyl;

wherein the alkyl, the alkyl at the alkylcarbonyl, the alkoxy, and the alkoxy at the alkoxycarbonyl of $R^1$ through $R^4$ may include a linear or branched, saturated or unsaturated bond, and the alkyl, aryl, alkanoyl, alkenyl, alkynoyl, aryloyl, alkoxycarbonyl, aryloxycarbonyl, carbamoyl or sulfamoyl of $R^1$ through $R^4$ may be further substituted with at least one substituent selected from the group consisting of halogen, cyano and hydroxyl; and B is a functional group maintaining a geometrically constant binding angle.

2. The optical compensation film according to claim 1, wherein A and A, or A' and A' are linked linearly to each other, and B is a functional group having no change in binding angle.

3. The optical compensation film according to claim 2, wherein B is selected from the group consisting of:

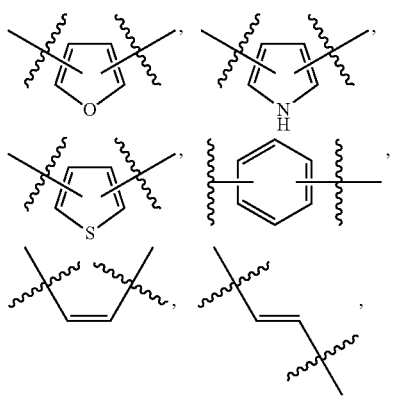

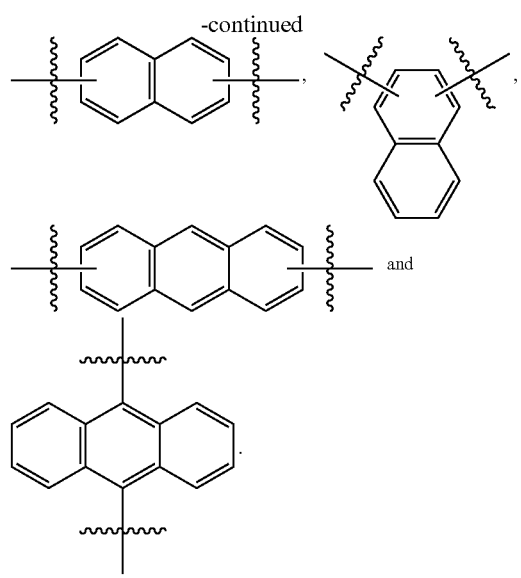

4. An optical compensation film, comprising:
a substrate layer;
an aligning layer disposed on the top of the substrate layer; and
a coating layer with hybrid alignment, disposed on the top of the aligning layer,
wherein the coating layer with hybrid alignment in which the alignment of a nematic liquid crystal compound including a compound represented by Chemical Formula 1 varies gradually along the thickness direction from the surface of the aligning layer:

[A]$_m$-B-[A']$_n$  [Chemical Formula 1]

wherein m and n independently represent a natural number ranging from 1 to 12;

A and A' are the same or different and each represents a discotic type mesogen or rod-like mesogen, wherein A' and A' or A and A are linked to each other via direct bonding between the two mesogens or by way of a spacer;

wherein A or A' is a compound represented by Chemical Formula 2:

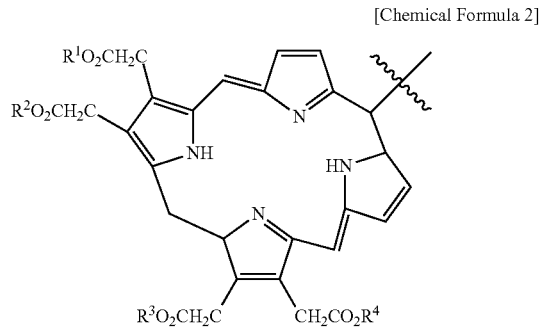

[Chemical Formula 2]

wherein $R^1$ through $R^4$ independently represent (C1-C14)alkyl, (C1-C14)alkoxy, (C1-C14)alkylcarbonyl, (C6-C20)aryl, (C6-C20)arylcarbonyl, (C1-C14)alkoxycarbonyl, (C6-C20)aryloxycarbonyl, carbamoyl or sulfamoyl;

wherein the alkyl, the alkyl at the alkylcarbonyl, the alkoxy, and the alkoxy at the alkoxycarbonyl of $R^1$ through $R^4$ may include a linear or branched, saturated or unsaturated bond, and the alkyl, aryl, alkanoyl, alkenoyl, alkynoyl, aryloyl, alkoxycarbonyl, aryloxycarbonyl, carbamoyl or sulfamoyl of $R^1$ through $R^4$ may be further substituted with at least one substituent selected from the group consisting of halogen, cyano and hydroxyl; and B is a functional group maintaining a geometrically constant binding angle.

5. The optical compensation film according to claim 4, wherein the substrate layer is selected from the group consisting of glass, olefinic resins, cycloolefinic resins, polycarbonate, polysulfone, polyether sulfone, polyacrylate, polymethacrylate, norbornene resins, cellulose triacetate (TAC), polyethylene terephthalate, and a mixture and a copolymer thereof.

6. The optical compensation film according to claim 4, wherein the aligning layer is selected from the group consisting of polyimide, polystyrene-based polymers, gelatin, polyvinyl alcohol-based polymers, and a mixture and a copolymer thereof.

7. The optical compensation film according to claim 6, wherein the aligning layer is a polyvinyl alcohol-based polymer.

8. A method for producing an optical compensation film, comprising:
   forming an aligning layer on a substrate film;
   coating a liquid crystal solution containing a nematic liquid crystal compound including a compound of Chemical Formula 1 on the top of the aligning layer to form a film with a hybrid liquid crystal alignment structure; and
   irradiating the resultant film with ultraviolet rays at 50-150° C. to immobilize the hybrid liquid crystal alignment structure:

$[A]_m$-B-$[A']_n$      [Chemical Formula 1]

wherein m and n independently represent a natural number ranging from 1 to 12;
   A and A' are the same or different and each represents a discotic type mesogen or rod-like mesogen;
   A or A' is a compound represented by Chemical Formula 2:

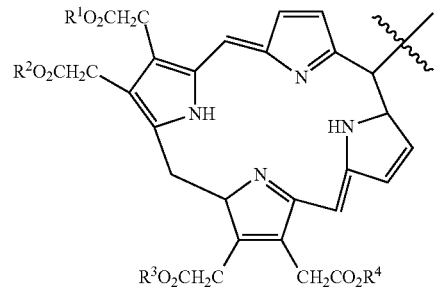

[Chemical Formula 2]

wherein $R^1$ through $R^4$ independently represent (C1-C14)alkyl, (C1-C14)alkoxy, (C1-C14)alkylcarbonyl, (C6-C20)aryl, (C6-C20)arylcarbonyl, (C1-C14)alkoxycarbonyl, (C6-C20)aryloxycarbonyl, carbamoyl or sulfamoyl;

wherein the alkyl, the alkyl at the alkylcarbonyl, the alkoxy, and the alkoxy at the alkoxycarbonyl of $R^1$ through $R^4$ may include a linear or branched, saturated or unsaturated bond, and the alkyl, aryl, alkanoyl, alkenoyl, alkynoyl, aryloyl, alkoxycarbonyl, aryloxycarbonyl, carbamoyl or sulfamoyl of $R^1$ through $R^4$ may be further substituted with at least one substituent selected from the group consisting of halogen, cyano and hydroxyl; and B is a functional group maintaining a geometrically constant binding angle.

9. The method for producing an optical compensation film according to claim 8, wherein the aligning layer is subjected to rubbing treatment.

10. The method for producing an optical compensation film according to claim 9, wherein the liquid crystal solution comprises 1-30 wt % of the liquid crystal compound based on the total solution.

11. A polarizer comprising the optical compensation film as defined in claim 1.

12. A liquid crystal display device using the optical compensation film as defined in claim 1.

* * * * *